United States Patent [19]

Penn

[11] 4,429,005
[45] Jan. 31, 1984

[54] ADHESIVE FOR SOLAR CONTROL FILM
[75] Inventor: Howard J. Penn, Cook County, Ill.
[73] Assignee: Morton Thiokol, Inc., Chicago, Ill.
[21] Appl. No.: 388,488
[22] Filed: Jun. 14, 1982

Related U.S. Application Data

[63] Continuation-in-part of Ser. No. 292,225, Aug. 12, 1981.

[51] Int. Cl.³ ............................................. C09J 7/02
[52] U.S. Cl. .................... 428/350; 428/447; 428/458; 525/440; 525/444
[58] Field of Search ............... 525/440, 444; 428/355, 428/447, 450, 480, 350

[56] References Cited

U.S. PATENT DOCUMENTS 4,206,299  6/1980  Yamazaki et al. .................. 528/288
4,345,053  8/1982  Rizk et al. .......................... 525/440

Primary Examiner—Wilbert J. Briggs, Sr.
Attorney, Agent, or Firm—Jack Axelrood

[57] ABSTRACT

A water-activatable adhesive useful for adhering a solar film, polyester (polyethylene terephthalate) film, to glass or to metal substrates. The adhesive comprises the reacted product of (A) gamma-isocyanatopropyltriethoxy silane, containing a free isocyanate (NCO) group, and (B) a thermoplastic polyester formed by reacting (i) a dibasic acid selected from the group consisting of terephthalic acid, isophthalic acid and hexahydrophthalic acid, and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, whereby substantially no free NCO remains in the adhesive.

Solar film is used for absorbing and/or reflecting solar radiation. Solar film can be a single sheet of polyester dyed sufficiently to absorb the glare of bright sunlight, or it can be a single sheet of polyester, on one side of which a reflective metal (most often aluminum) is deposited in an amount which can be totally reflective or in an amount which still allows visible light transmission and over which a protective coating is deposited, or it can be a laminated structure of the reflective film adhered to a clear or dyed polyester film by which means the reflective metal is sandwiched between two layers of polyester film, or it can be a laminated structure of a reflective film to a polyolefin film.

2 Claims, No Drawings

4,429,005

ADHESIVE FOR SOLAR CONTROL FILM

CROSS REFERENCE TO PRIOR APPLICATION

This is a continuation-in-part of application Ser. No. 292,225 filed Aug. 12, 1981.

BACKGROUND OF THE INVENTION

1. Field of the Invention

The field of this invention is generally that of adhesives useful for bonding solar film, and for providing solar films for adherence to glass or metal substrates.

2. Description of the Prior Art

Flexible polymeric substrates have been adhered to dissimilar substances, particularly glass, by a variety of adhesives. The need for adhering polymeric substrates to glass arises as one of a variety of concerted efforts in recent years to conserve energy. In hot weather, it is important to reduce the transmission of sunlight into a room while still maintaining adequate visibility.

Obviously, the less radiation which enters a room, the less need for energy expenditures for air-conditioning. One way in which this has been accomplished is by the use of reflective film, so-called "solar film", which is adhered directly onto window glass.

The common type of solar film comprises a base sheet of a transparent polyester, usually a polyethylene terephthalate film, onto one side of which a thin but reflective and transparent layer of aluminum has been vapor-deposited. It is of course possible to provide solar films with coatings of metals other than aluminum thereon. Onto the metal surface either a protective coating may be applied or a polymer film, usually polyester, dyed or clear, may be laminated with the use of a polymeric adhesive. Solar films are described in U.S. Pat. Nos. 4,157,417; 3,681,179; 4,095,013, and 3,152,950.

There is also another variety of solar film in use which does not have a metallic coating thereon, but which is dark in color and functions to exclude glare. This type is referred to in the trade as "dark smoke".

Thus, when a partially reflective solar film is in place, sunlight is partially reflected at the surface of the window with the result that there is a significant reduction in the amount of sunlight entering and thereby heating a room.

In addition, a protectively coated, opaquely metallized polyester film coated on its second surface with a polyester adhesive, as described in Example 12 hereinafter set forth, may be adhered to substrates other than glass, such as aluminum or steel, for example. The finished composite can function as a mirror to reflect light. If the finished composite is curved, e.g., parabolically, then sunlight can be focused to furnish a source of heat, for use in heating water, for example. The film can be considered disposable and when no longer useful, can be peeled from the substrate and replaced with new reflector film.

Various adhesives and adhesive systems have been described for adhering solar film to window glass. U.S. Pat. No. 3,290,203 (Antoneon and Berger) discloses water-activatable adhesives comprising casein, glue, polyvinyl alcohol and vinyl ether polymers.

U.S. Pat. No. 3,152,950 (Palmquist) discloses the use of a pressure-sensitive adhesive compound of a rubbery butadiene-acrylonitrile polymer and a phenol-formaldehyde resin.

U.S. Pat. No. 3,308,004 (Rouault) discloses translucent panels having a protective coating of reinforced cross-linked polyester resin.

U.S. Pat. No. 3,619,335 (Bryan) discloses laminates having a removable flexible polymeric film plasticized with a nonionic surfactant.

U.S. Pat. No. 3,681,179 (Theissen) discloses the use of a water soluble film-forming material which is deposited over a pressure-sensitive adhesive layer on the aluminum coated side of solar film. The water soluble film-forming material includes ethyl cellulose, or vinyl ether-maleic acid copolymer, or an ethylene oxide polymer.

U.S. Pat. No. 4,095,013 (Burger) teaches the use of a cling adhesive comprising a plasticized solvent-soluble copolymer consisting of vinyl chloride copolymerized with vinyl acetate, vinyl alcohol, or dibasic acid, or vinylidene chloride-acrylonitrile copolymer.

U.S. Pat. No. 4,146,585 (Ward) teaches a process for producing a silane grafted copolymer which comprises reacting a silane with vinyl chloride, hydroxyalkyl acrylate and a polymerizable monomer selected from the group consisting of alkyl esters of alpha, beta ethylenically unsaturated carboxylic acids and vinyl esters of saturated fatty acids.

U.S. Pat. No. 4,157,417 (Murphy) discloses an adhesive for a solar film wherein the adhesive comprises a physical mixture of an alkyl monoester of poly (methyl vinyl ether/maleic anhydride) and a silane such as beta-3,4(epoxycyclohexyl) ethyltrimethoxysilane or gamma-glycidoxypropyltrimethoxysilane with certain diols and aryl ethers.

U.S. Pat. No. 4,031,120 (Gervase) teaches the use of isocyanato organosilanes in combination with polyisocyanates and polymeric materials as adhesive materials for bonding vulcanizable elastomers at elevated temperatures to inorganic substrates.

Thus, there is a continuing need for an adhesive which can be applied directly to solar film for adherence to window glass or to metals, and which will provide early and long-term bond strength upon exposure to sunlight, heat and humidity.

It is therefore the principal object of this invention to provide adhesive compositions which can be applied directly to solar film for direct adherence to window glass or to metals, which adhesives exhibit good early bond strength and excellent bond strength upon long-term exposure to sunlight, heat and humidity.

SUMMARY OF THE INVENTION

Broadly, the present invention relates to an improved, water-activatable adhesive composition for bonding solar film, through either its polyester base or metal-coated surface, to window glass for the purpose of reflecting sunlight from the window, with the beneficial result that sunlight radiation into the interior of a room is significantly reduced. The adhesive, which is useful for adhering polyester film, and hence solar film, to glass, comprises the reacted product of (A) gamma-isocyanatopropyltriethoxy silane, which contains a free NCO group, and (B) a thermoplastic polyester formed by reacting (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula HOOC(CH$_2$)$_n$COOH where n is an integer from 1 to 8, and mixtures of such acids, whereby substantially no free isocyanate (NCO) remains in the adhesive. The present invention also relates to said improved, water-activatable adhesive composition which can be used to bond an opaquely metallized solar film to a metal substrate to provide a reflective surface for focusing incident sunlight to provide a source of heat.

Gamma-isocyanatopropyltriethoxy silane, also known by its CAS name as Silane, 3-(isocyanato) propyl triethoxy, is an organo functional silane which is commercially available under the trade designation "Silane Y-9030" From Union Carbide Corporation. It is a corrosive liquid which must be handled with care since it presents severe skin, eye and inhalation hazards.

It has been found that when gamma-isocyanatopropyltriethoxy silane, hereinafter referred to as "Silane", is reacted with a particular group of thermoplastic polyesters so that substantially no free isocyanate (NCO) remains, an adhesive composition is formed which can be coated onto a polyester film, or onto the polyester or metal-coated side of solar film, and the adhesive-coated film adhered to window glass to form a strongly adherent film thereon which remains bonded upon long exposure to sunlight, even under conditions of elevated temperatures and high humidity. One important property of the adhesive of this invention is its relatively early bond strength which improves with age.

The following are examples of the thermoplastic polyesters with which Silane is reacted:

| TRADE DESIGNATION AND SOURCE | COMPOSITION |
| --- | --- |
| "49,000" - Available from E. I. Du Pont de Nemours & Company | Formed by reacting and polymerizing 1,3-benzene-dicarboxylic acid (isophthalic acid), 1,4-benzene dicarboxylic acid (terephthalic acid), 1,2-ethanediol, hexanediol and nonanedioic (azelaic) acid. |
| "49,001" - Available from E. I. Du Pont de Nemours & Company | Formed by reacting and polymerizing isophthalic acid, terephthalic acid, 1,2-ethanediol, butanediol and azelaic acid. |
| "Vitel 307" - Available from The Goodyear Tire & Rubber Company | A polyester formed by reacting dimethyl terephthalate, isophthalic acid, azelaic acid, ethylene glycol and neopentyl glycol. |
| "Vitel 5833" - Available from The Goodyear Tire & Rubber Company | A trifunctional polyester formed principally by reacting dimethyl terephthalate, isophthalic acid, azelaic acid, ethylene glycol, neopentyl glycol and tetramethylene glycol. |
| "Vitel PE-200" - Available from the Goodyear Tire & Rubber Company | A polyester formed by reacting dimethyl terephthalate, isophthalic acid, ethylene glycol and neopentyl glycol. |

These polyesters will be referred to hereinafter in the examples by the abbreviations "49000", "49001", "Vitel 307", "Vitel 5833" and "Vitel PE-200" respectively. These resins, as commercially available, contain about 0.1–0.3% moisture. This moisture content had no adverse effect on the properties of the adhesives of this invention.

The dibasic acids from which the thermoplastic polyesters are formed may be isophthalic acid, terephthalic acid, hexahydrophthalic acid, or a saturated dibasic acid having the formula HOOC(CH$_2$)$_n$COOH where n is an integer from 1 to 8, such as malonic, succinic, glutaric, adipic, pimelic, suberic, azelaic and sebacic acid, or mixtures thereof.

The glycol with which the dibasic acid, or acids, may be reacted can be a diglycol having the formula HO(CH$_2$)$_x$OH where x is an integer from 2 to 10. Included in this group are ethylene glycol, propylene glycol, 1,4-butanediol, 1,5-pentanediol, 1,6-hexanediol, and the like. Triols such as glycerin and branched diols such as neopentyl glycol are also operable.

The adhesives of the present invention are formed by reacting the Silane with the polyester such that substantially no free NCO remains in the adhesive. This is accomplished conveniently by heating an admixture of these components in a solvent system whereby the Silane is reacted through its NCO group with the polyester to form the final composition. Solvents such as toluene, methyl ethyl ketone, cellosolve acetate, and a variety of aromatic, oxygenated and esterified solvents may be employed.

Polyester adhesives, in present industrial practice, are used to adhere polyester film (polyethylene terephthalate) to polyester film. Although as evidenced in some of the following examples, polyester adhesives will adhere polyester film to glass, these adhesives offer almost no bond strength upon exposure to humid conditions. Also apparent from several examples hereinafter set forth, monomeric Silane mixed (but not reacted) with polyester will function to adhere polyester film to glass, but the performance is inferior to and less constant in its behavior than when the Silane is introduced into the polymer by reaction.

A further constraint on the use of the Silane in its free form is its volatility (equivalent to butyl acetate), making it difficult to retain in the coated film when subjected to forced air heating. As previously noted, Silane is also extremely toxic.

Suitable polyurethane catalysts for the Silane-polyester reaction are the tin compounds, such as dibutyl tin diacetate, although other suitable catalysts may be used. These include the following: the stannous salts of carboxylic acids, such as stannous octoate, stannous oleate, stannous acetate and stannous laurate; dialkyltin oxides; trialkyltin oxides, tertiary amines; and tin mercaptides such as di-n-octyltin mercaptide; dialkyltin dicarboxylates such as dibutyltin dilaurate, dibutyltin diacetate, dilauryltin diacetate, dibutyltin di(2-ethylhexanoate). Of course, it is possible to use other suitable catalysts which are known to those skilled in the art.

In view of the fact that one of the principal uses of the present adhesive is to adhere solar film to window glass, it is desirable, although not necessary, to include an ultraviolet light absorber in the adhesive which is coated onto the film. A variety of such ultraviolet absorbers is available and includes a substituted benzotriazole available under the trademark "Tinuvin 328" from the Ciba-Geigy Company. In the examples which are hereinafter set forth, Tinuvin 328, in small quantities, is used as the ultraviolet absorber.

In the present adhesive, the concentration of Silane, based on thermoplastic polyester reactant, may range from as little as 0.2% to as much as 25% or more. This ratio is not critical as excellent bond strengths are obtained over the entire range and the upper limit is dictated by cost considerations which arise by using more of the Silane than is necessary for effective performance.

The present invention also relates to a method for preparing a water-activatable adhesive comprising reacting Silane with a thermoplastic polyester formed by reacting, i.e., admixing and heating, (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, until substantially no free isocyanate (NCO) remains in the adhesive.

In another aspect, the general invention relates to an improved sheet material for adherence to window glass for solar control, said sheet material, i.e., solar film, comprising either a single sheet of polyester dyed sufficiently to absorb the glare of bright sunlight, or a single sheet of polyester, on one side of which a reflective metal (most often aluminum) is deposited in an amount which is totally reflective or in an amount which still allows visible light trasmission and over which a protective coating is deposited, or a laminated structure of the reflective film adhered to a clear or dyed polyester film by which means the reflective metal is sandwiched between two layers of polyester film, or a laminated structure of a reflective film to a polyolefin film, the improvement comprising, coated on the uncoated side of said solar film, a water-activatable adhesive comprising the reacted product of (A) Silane and (B) a polyester formed by reacting (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, whereby substantially no free isocyanate (NCO) remains in the adhesive.

In another aspect, the general invention relates to an improved sheet material for adherence to a metal substrate for providing a reflective surface for focusing incident sunlight to provide heat, said sheet material, i.e., solar film, comprising a sheet of polyester, on one side of which a reflective metal (most often aluminum) is deposited in an amount which is totally reflective and over which a protective coating is deposited, the improvement comprising a coating on the uncoated side of said solar film of a water-activatable adhesive comprising the reacted product of (A) Silane and (B) a polyester formed by reacting (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, whereby substantially no free isocyanate (NCO) remains in the adhesive.

In practice, the adhesives of the present invention are provided in an appropriate solvent system and are coated directly onto the solar film by any suitable method. The solvent is removed by force drying at a temperature in excess of about 200° F., preferably at about 230°-250° F. The coated solar film may be rolled up for storage with a release film of polypropylene or the like. For application to glass, the adhesive coated side is wetted with water, and, in addition, water is applied to the glass itself. The film is then slid into place as desired and the excess water is removed by using a squeegee.

One important property of the adhesives of this invention is that they can be coated onto solar film and wound up with a release sheet into a roll and stored for long periods of time, as long as one year or more, without impairing their excellent adhesive bonding properties.

For a more complete understanding of the present invention, reference is now made to the following specific examples illustrating the improved adhesive, process and solar film of the invention.

DESCRIPTION OF THE PREFERRED EMBODIMENTS

EXAMPLE 1

Polyester Solution A was prepared by dissolving the polyester resin "49,000" in a mixture of solvents according to the following formulation:

| POLYESTER SOLUTION A | |
|---|---|
| | % By Weight |
| 49,000 | 10 |
| Methyl ethyl ketone | 50 |
| Toluene | 25 |
| Methyl cellosolve acetate | 15 |

Adhesive Composition A was prepared by mixing Polyester Solution A with Silane and dibutyl tin diacetate in the following proportions:

| ADHESIVE COMPOSITION A | |
|---|---|
| | % By Weight |
| Polyester Solution A | 100 |
| Silane | 0.5 |
| Dibutyl tin diacetate | 0.1 |

ADHESIVE COMPOSITION A

|  | % By Weight |
|---|---|
| (2% solution in toluene) | |

Adhesive Composition A was incubated for 8 days at a temperature of 140° F., after which time an infra-red analysis indicated that no free isocyanate (NCO) was present. Thereafter, 1.5 parts of a 10% solution of a substituted benzotriazole ultra-violet absorber, sold under the trademark "Tinuvin 328", was added to 100 parts of Adhesive Composition A.

Polyester Solution A was admixed with Silane and dibutyl tin diacetate in the following proportions to form Adhesive Composition B:

ADHESIVE COMPOSITION B

|  | Parts by Weight |
|---|---|
| Polyester Solution A | 100 |
| Silane | 2.0 |
| Dibutyl tin diacetate | 0.2 |
| (2% solution in toluene) | |

Adhesive Composition B was incubated for 4 days at 140° F., after which time an infra-red analysis indicated that no free NCO, was present. Thereafter, 1.5 parts of a 10% solution of Tinuvin 328 was added to Adhesive Composition B.

One and one-half parts of a 10% solution of Tinuvin 328 was also added to 100 parts of Polyester Solution A to provide a Control (Control A).

COATING PROCEDURE

Adhesive Composition A, Adhesive Composition B and Control A were each coated onto a dyed polyester solar film, known in the trade as "dark smoke", using a wire wound rod, and force dried at a temperature of 230°–250° F. The dried, coated film was then rolled up with a 0.75 mil. film of polypropylene as a release sheet onto a ¾" core and stored at 95° F.

Evaluation

After 5 months of storage, 1 inch strips of the coated polyester film were cut, wetted with water and the coated wetted side was applied to the interior surface of window glass facing Southeast at ambient room temperature.

After 5 months of exposure, the bond strength of each coated polyester film to the glass was determined by means of a Hunter gage which measures in grams per inch width the force required to peel the film from the glass at a 90° angle.

The following bond strengths were obtained:

|  | Bond Strength (grams/inch) |
|---|---|
| Control A | 0 - no bond |
| Adhesive Composition A | 1200 |
| Adhesive Composition B | 900 |

The following Table 1 summarizes the compositions of Example 1, on a solvent-free basis, and the strengths of the polyester film-glass bonds obtained:

TABLE 1

|  | Control A | Adhesive A | Adhesive B |
|---|---|---|---|
| 49,000 | 10 | 10 | 10 |
| Silane |  | 0.5 | 2.0 |
| Dibutyl tin diacetate |  | 0.002 | 0.004 |
| Tinuvin 328 10% solution | 0.15 | 0.15 | 0.15 |
| Reaction Conditions |  | 4 days, 140° F. | 8 days, 140° F. |
| Bond Strength | 0 | 1200 | 900 |
| % Silane on Polyester Basis | 0 | 5.0 | 20.0 |

EXAMPLE 2

Polyester Solution D was prepared by dissolving "Vitel-307", and Tinuvin 328 in methyl ethyl ketone according to the following formulation:

POLYESTER SOLUTION D

|  | Parts By Weight |
|---|---|
| Vitel - 307 | 20 |
| Methyl ethyl ketone | 80 |
| Tinuvin 328, 10% solution | 2.0 |

Polyester Solution E was prepared by admixing "Vitel 5833" with methyl ethyl ketone in the following proportions:

POLYESTER SOLUTION E

|  | % By Weight |
|---|---|
| Vitel 5833 | 20 |
| Methyl ethyl ketone | 80 |

ADHESIVE COMPOSITION D

Adhesive Composition D was prepared by admixing Polyester Solution E with Silane and dibutyl tin diacetate according to the following formulation:

ADHESIVE COMPOSITION D

|  | Parts By Weight |
|---|---|
| Polyester Solution E | 100 |
| Silane | 4 |
| Dibutyl tin diacetate | 0.08 |
| NCO:OH = 1:1 | |

Adhesive Composition D was incubated for 4 days at 150° F. Infra-red analysis indicated that no free NCO was present. The following adhesive compositions were made by admixing Adhesive Composition D with Polyester Solution D in the indicated proportions:

|  | ADHESIVE COMPOSITION | | | CONTROL |
|---|---|---|---|---|
|  | D-1 | D-2 | D-3 |  |
| Polyester Solution D | 94.5 | 97.3 | 98.7 | 100 |
| Adhesive Composition D | 5.5 | 2.7 | 1.3 |  |

Each of the Adhesive Compositions D-1, D-2 and D-3, plus the Control, was manually coated onto a 1 mil dark smoke dyed polyester film using a #18 wire-wound rod, followed by force drying at 230°–250° F. Coated films were wound onto a ¾" core using a slip sheet to prevent blocking of the adhesive surface to the polyester film surface. After 5 days at room temperature, 1" strips of each were cut, the slip sheet removed and the coated strips were applied to the interior and to the exterior surfaces of window glass respectively, after first spraying the surface of the glass and the coated film with water to wet same.

Measurements of bond strengths were made after 2 days and 3 weeks of Southeast exposure respectively. The results obtained are set forth in the following Table 2. The measurements of bond strengths in this and in all succeeding examples were made in accordance with the procedure of Example 1.

TABLE 2

| Adhesive Composition | D-1 | D-2 | D-3 | Control |
|---|---|---|---|---|
| INTERIOR SURFACE | | | | |
| 2 Days | 425 | 200 | 120 | 50 |
| 3 Weeks | 800 | 700 | 260 | 200 |
| EXTERIOR SURFACE | | | | |
| 2 Days | 300 | 270 | 200 | 0 |
| 3 Weeks | 600 | 500 | 650 | <50 |
| % Silane on polyester basis | 1.0 | 0.5 | 0.25 | 0 |

EXAMPLE 3

Adhesive Compositions E and F were prepared by admixing Polyester Solutions D and E of Example 2 respectively with Silane and dibutyl tin diacetate in the following proportions:

| | % By Weight |
|---|---|
| ADHESIVE COMPOSITION E | |
| Polyester Solution E | 100 |
| Silane | 4.0 |
| Dibutyl tin diacetate (2% in toluene) | 0.04 |
| ADHESIVE COMPOSITION F | |
| Polyester Solution D | 100 |
| Silane | 0.4 |
| Dibutyl tin diacetate (2% in toluene) | 0.06 |

Adhesive Compositions E and F were each incubated for two days at a temperature of 150° F., after which time an infra-red analysis showed that no free NCO was present.

The following adhesives, E-1 and EF-1, were prepared by admixing Adhesive Compositions E and F with Polyester Solutions D and E and Tinuvin 328 in the indicated proportions:

| | ADHESIVE E-1 | ADHESIVE EF-1 | CONTROL |
|---|---|---|---|
| Polyester Solution D | 100 | 50 | 100 |
| Polyester Solution E | | | 17 |
| Adhesive Composition E | 15 | 9 | |
| Adhesive Composition F | | 50 | |
| Tinuvin 328 | 0.3 | 0.3 | 0.3 |

Each adhesive and the Control, were coated onto 1 mil thick dark smoke dyed polyester in the same manner as in Example 2 and then applied to the interior and exterior surfaces of window glass respectively. Measurements of bond strengths were made after 7 days, 2 weeks and 3 weeks respectively. The results are set forth in Table 3.

TABLE 3

| | ADHESIVE E-1 | ADHESIVE EF-1 | CONTROL |
|---|---|---|---|
| INTERIOR | | | |
| 7 Days | 575 | 550 | 220 |
| 2 Weeks | 700 | 800 | 100 |
| 3 Weeks | 1,300 | 1,200 | 200 |
| % Silane on Polyester Basis | 2.5 | 2.5 | 0 |
| EXTERIOR | | | |
| 7 Days | 650 | 850 | 350 |
| 2 Weeks | 1,000 | 1,200 | 140 |
| 3 Weeks | 1,300 | 1,100 | 50 |
| % Silane on Polyester Basis | 2.5 | 2.5 | 0 |

EXAMPLE 4

Polyester Solution 4A was prepared by admixing Vitel 307 with methyl ethyl ketone in the following proportions:

| POLYESTER SOLUTION 4A | |
|---|---|
| | % By Weight |
| Vitel 307 | 20 |
| Methyl ethyl ketone | 80 |

Adhesives 4A, 4B and 4C were made by admixing Silane and dibutyl tin diacetate with Polyester Solution 4A in the following proportions:

| | ADHESIVE 4A | ADHESIVE 4B | ADHESIVE 4C |
|---|---|---|---|
| Polyester Solution 4A | 100 | 100 | 100 |
| Silane | 0.4 | 1.0 | 2.0 |
| Dibutyl tin diacetate (2% solution in toluene) | 0.06 | 0.08 | 0.1 |

The foregoing adhesives were incubated for 2 days at 150° F., after which time no free NCO was detected upon infra-red analysis. Two parts of 10% toluene solution of ultraviolet absorber Tinuvin 328 were added to 100 parts of Polyester Solution 4A, Adhesive 4A, Adhesive 4B and Adhesive 4C respectively. Each resultant composition was then coated onto 1 mil thick dark smoke dyed polyester in the same manner as in Example 2. After storage for one week at 95° F., one inch strips of each coated film were cut, the slip sheet removed and the coated strips were applied to the interior surface of window glass after first spraying the surface of the glass and the coated film to wet same.

Measurements of bond strengths were made after 3 months of Southeast exposure. The following results were obtained:

| | POLYESTER SOLUTION 4A | ADHESIVE 4A | ADHESIVE 4B | ADHESIVE 4C |
|---|---|---|---|---|
| Bond strength | 700 | 1,200 | 1,250 | 1,300 |
| % Silane, Polyester basis | 0 | 2.0 | 5.0 | 10.0 |

EXAMPLE 5

Polyester Solution E of Example 2 was admixed with Silane and dibutyl tin diacetate in the following proportions to prepare the indicated adhesives.

|  | ADHESIVE 5A | ADHESIVE 5B |
|---|---|---|
| Polyester Solution E | 100 | 100 |
| Silane | 1.4 | 2.8 |
| Dibutyl tin diacetate (2% Solution) | 0.06 | 0.06 |
| NCO:OH | 1:3 | 2:3 |

The foregoing adhesives were incubated for 2 days at 150° F., after which time no free NCO was detected upon infra-red analysis.

Adhesives 5C, 5D, 5E and 5F, formed from blends of Polyester Solution E and Adhesive 5A, Adhesive 5B, Adhesive 4A and Adhesive 4B respectively, each containing 2 parts of a 10% toluene solution of the ultraviolet absorber Tinuvin 328, were prepared according to the following formulations:

|  | ADHESIVE 5C | ADHESIVE 5D | ADHESIVE 5E | ADHESIVE 5F |
|---|---|---|---|---|
| Polyester Solution E (plus Tinuvin 328) | 100 | 100 |  |  |
| Adhesive 5A | 10 |  | 20 |  |
| Adhesive 5B |  | 5 |  | 10 |
| Adhesive 4A (plus Tinuvin 328) |  |  | 100 |  |
| Adhesive 4B (plus Tinuvin 328) |  |  |  | 100 |

The foregoing adhesives were coated onto 1 mil thick dark smoke dyed polyester according to the procedure of Example 2. After storage for 7 days at 95° F., the coated film was adhered to the interior surface of window glass as set forth in Example 2. After 3 months of Southeast exposure, the following bond strength values were obtained.

|  | ADHESIVE 5C | ADHESIVE 5D | ADHESIVE 5E | ADHESIVE 5F |
|---|---|---|---|---|
| Bond strength | 1,400 | 1,500 | 1,550 | 2,000 |
| % Silane, on | 0.6 | 0.63 | 2.7 | 5.5 |

EXAMPLE 6

Polyester Solution 6 was prepared by admixing Vitel 307 and methyl ethyl ketone in the following proportions:

| POLYESTER SOLUTION 6 | |
|---|---|
|  | % By Weight |
| Vitel 307 | 20 |
| MEK | 80 |

Adhesives 6A, 6B, 6C, 6D, 6E, 6F and 6G were prepared by admixing Polyester Solution 6 with isocyanatopropyltriethoxy Silane and dibutyl tin diacetate in the following proportions:

|  | ADHESIVES | | | | | | |
|---|---|---|---|---|---|---|---|
|  | 6A | 6B | 6C | 6D | 6E | 6F | 6G |
| Polyester Solution 6 | 100 | 100 | 100 | 100 | 100 | 100 | 100 |
| Silane | 0.04 | 0.1 | 0.2 | 0.4 | 1.0 | 3 | 5 |
| 2% Dibutyl Tin Diacetate | 0.06 | 0.06 | 0.08 | 0.06 | 0.08 | 0.18 | 0.25 |

The adhesives were incubated for 2 days at 150° F. Infra-red analysis for free NCO was negative. To 100 parts of each solution, 2 parts of 10% solution of Tinuvin 328 was added.

Using a #12 wire wound rod, each adhesive was coated onto 1 mil dark smoke dyed polyester film, forced dried and wound on to a ¾" core using 0.7 mil polypropylene as slip sheet.

After 1 week at room temperature, 1" strips were cut and, after removing the slip sheet, each coated strip was adhered to a glass panel after wetting with water. Each glass panel was then affixed to the interior surface of single glazed window exposed to the Southeast.

After 8 days, the bond strengths obtained were as follows:

|  | ADHESIVES | | | | | | |
|---|---|---|---|---|---|---|---|
|  | 6A | 6B | 6C | 6D | 6E | 6F | 6G |
| Polyester Solution 6 Bond Strength 150 | 200 | 650 | 300 | 320 | 500 | 950 | 480 |
| % Silane, 0 Polyester Basis | 0.2 | 0.5 | 1.0 | 2.0 | 5.0 | 13 | 20 |

The glass panels were thereafter placed in a humidity chamber held at 90% relative humidity (RH) and 100° F. After 4 days, the glass panels were removed and the bond strengths were determined immediately after removal. The following results were obtained:

|  | ADHESIVES | | | | | | |
|---|---|---|---|---|---|---|---|
|  | 6A | 6B | 6C | 6D | 6E | 6F | 6G |
| Polyester Solution 6 Bond Strength 90 | 130 | 170 | 500 | 570 | 1100 | 920 | 490 |
| % Silane 0 Polyester Basis | 0.2 | 0.5 | 1.0 | 2.0 | 5.0 | 13 | 20 |

After 2 hours at ambient conditions, the bond strengths were determined again, with the following results:

|  | ADHESIVES | | | | | | |
|---|---|---|---|---|---|---|---|
|  | 6A | 6B | 6C | 6D | 6E | 6F | 6G |
| Polyester Solution 6 Bond Strength 140 | 300 | 500 | 520 | 570 | 1400 | 1100 | 680 |
| % Silane, Polyester | 0.2 | 0.5 | 1.0 | 2.0 | 5.0 | 13 | 20 |

|         | ADHESIVES |    |    |    |    |    |    |
|---------|-----------|----|----|----|----|----|----|
|         | 6A        | 6B | 6C | 6D | 6E | 6F | 6G |
| Basis 0 |           |    |    |    |    |    |    |

EXAMPLE 7

Polyester Solution 7 was prepared by dissolving "Vitel PE 200" in toluene, methyl ethyl ketone and methyl cellosolve acetate according to the following formulation:

| POLYESTER SOLUTION 7 | |
|---|---|
| | % By Weight |
| Vitel PE 200 | 25 |
| Toluene | 16.4 |
| Methyl ethyl ketone | 50.0 |
| Methyl cellosolve acetate | 8.3 |
| Tinuvin 328 (10% solution) | 0.3 |

Adhesive 7 was prepared according to the following formulation:

| ADHESIVE 7 | |
|---|---|
| | % By Weight |
| Vitel 5833 | 21.7 |
| Methyl ethyl ketone | 73.8 |
| Silane | 4.1 |
| Dibutyl tin dilaurate (2% solution in toluene) | 0.043 |

Adhesive 7 was reacted under a blanket of nitrogen at a temperature of 70° C. After 44 hours, no NCO was detected upon infra-red analysis. Adhesives 7A and 7B were prepared by admixing Polyester Solution 7 and Adhesive 7 in the following proportions:

|                      | Adhesive 7A | Adhesive 7B |
|----------------------|-------------|-------------|
| Polyester Solution 7 | 91.0        | 86.0        |
| Adhesive 7           | 9.0         | 14.0        |

Adhesives 7A, 7B and Polyester Solution 7 were each coated onto dark smoke dyed polyester film, as in Example 1, and were dried in a forced air oven at 115° C. One inch strips were cut, wetted with water and applied to glass panels which were also wetted with water.

The coated glass panels were incubated for 10 days at 120° F., after which time the bond strengths were determined. Thereafter, the coated panels were placed in a humidity chamber maintained at a temperature of 100° F. and 90% relative humidity for a period of 6 days, after which bond strengths were again determined. The results obtained were as follows:

| BOND STRENGTHS | | | |
|---|---|---|---|
| | Adhesive 7A | Adhesive 7B | Polyester Solution 7 |
| 10 days at 120° F. | 400 | 425 | 250 |
| 6 days 100° F. and 90% R.H. | 400 | 820 | <50 |
| % Silane Polyester Basis | 1.2 | 2.3 | 0 |

EXAMPLE 8

Polyester Solution 8 was prepared by dissolving in methyl ethyl ketone Tinuvin 328 and "49001", according to the following formula:

| POLYESTER SOLUTION 8 | |
|---|---|
| | % By Weight |
| DuPont 49001 | 20 |
| Methyl ethyl ketone | 80 |
| Tinuvin 328 - 10% solution | 0.25 |

Adhesive 8 was prepared according to the following formulation:

| ADHESIVE 8 | |
|---|---|
| | % By Weight |
| Vitel 5833 | 20 |
| Methyl ethyl ketone | 80 |
| Silane | 4 |
| 2% solution of dibutyl tin diacetate | 0.4 |

This solution was incubated for 4 days at 150° F. Infra-red analysis indicated no free NCO.

Adhesives 8A and 8B were prepared by blending Polyester Solution 8 with Adhesive 8 as follows:

|                      | Adhesive 8A | Adhesive 8B |
|----------------------|-------------|-------------|
| Polyester Solution 8 | 91.7        | 84          |
| Adhesive 8           | 8.3         | 16          |

Adhesives 8A and 8B, together with Polyester Solution 8, were coated onto dyed dark smoke polyester as in Example 1, and force dried at 110° C. The dried, coated polyester film was rolled up using polypropylene (0.75 mil thick) as a slip sheet.

After storage for one month at 95° F., strips of the coated film were adhered to glass panels, after first wetting the glass and the coated film, and then removing excess water.

After 3 weeks of storage at 95° F., the bond strengths of the coated glass panels were determined. The coated glass panels were then transferred to a humidity chamber and held for one month at 100° F. and 90% relative humidity, after which time bond strengths were again determined. The results obtained were as follows:

| | Adhesive 8A | Adhesive 8B | Polyester Solution 8 |
|---|---|---|---|
| 3 weeks - 95° F. | 1250 | 1100 | 600 |
| 1 month 90% R.H., 100° F. | 950 | 900 | 50 |
| % Silane on polyester basis | 1.6 | 3.0 | 0 |

EXAMPLE 9

Polyester Solutions 9 and 10 were prepared by dissolving "Vitel 5833" and "Vitel 307" respectively in methyl ethyl ketone according to the following formulations:

|  | Polyester Solution 9 % By Weight | Polyester Solution 10 % By Weight |
|---|---|---|
| 5833 | 30 |  |
| 307 |  | 20 |
| Methyl ethyl ketone | 70 | 80 |

Adhesives 9A, 9B, 9C, 9D and 9E, were prepared by admixing Polyester Solution 9 with Silane and a 2% solution of dibutyl tin diacetate in the following proportions, with the control (Control A) consisting of only Polyester Solution 9 and dibutyl tin diacetate.

|  | ADHESIVES | | | | | CONTROL A |
|---|---|---|---|---|---|---|
|  | 9A | 9B | 9C | 9D | 9E |  |
| Polyester Solution 9 | 100 | 100 | 100 | 100 | 100 | 100 |
| Silane | 1.95 | 3.9 | 5.9 | 7.7 | 8.8 |  |
| Dibutyl tin diacetate (2% solution) | 0.06 | 0.06 | 0.06 | 0.08 | 0.1 | 0.06 |
| NCO:OH | 0.33 | 0.67 | 1.0 | 1.3 | 1.5 |  |

The solutions were incubated at 140°–150° F. until no free NCO remained upon infra-red analysis. The time periods necessary to achieve this condition for each Adhesive were as follows:

|  | ADHESIVES | | | | |
|---|---|---|---|---|---|
|  | 9A | 9B | 9C | 9D | 9E |
| Time (days) | 2 | 4 | 4 | 4 | 5 |

Even though the Control contained no Silane, it was incubated for 3 days to nullify any effects that heating may have had on the polyester.

Adhesives 9A, 9B, 9C, 9D and 9E, and the Control A were admixed with Polyester Solution 10, Tinuvin 328 and toluene in the following proportions to provide the Coating Adhesives 9B, 9C, 9D, 9E and 9F, with control (Control B) consisting of a mixture of Control A, Polyester Solution 10, Tinuvin 328 and toluene.

|  | COATING ADHESIVES | | | | | CONTROL B |
|---|---|---|---|---|---|---|
|  | 9B | 9C | 9D | 9E | 9F |  |
| Polyester Solution 10 | 100 | 100 | 100 | 100 | 100 | 100 |
| Control A |  |  |  |  |  | 7.9 |
| Adhesive 9A | 7.7 |  |  |  |  |  |
| Adhesive 9B |  | 7.4 |  |  |  |  |
| Adhesive 9C |  |  | 7.2 |  |  |  |
| Adhesive 9D |  |  |  | 7.0 |  |  |
| Adhesive 9E |  |  |  |  | 7.0 |  |
| 10% solution Tinuvin 328 in toluene | 3.4 | 3.4 | 3.4 | 3.4 | 3.4 | 3.4 |
| Toluene | 2.4 | 2.7 | 2.9 | 3.1 | 3.1 | 2.0 |

The foregoing Coating Adhesives and Control B were each coated onto dark smoke polyester solar film according to the Coating Procedure of Example 1 and force dried at 115° C.

Each coated film was slip-sheeted with polypropylene film and stored for 3 days at 95° F. The coated films were thereafter adhered to individual glass panels by wetting both the glass and the coated film, and then removing the excess water by means of a squeegee. After 4 days at 120° F., bond strength measurements were determined and recorded. The panels were then transferred to a humidity chamber and maintained there for 3 days at a temperature of 100° F. and a relative humidity of 90%. After 3 days, the bond strengths were measured. The results obtained were as follows:

|  | BOND STRENGTHS | | % Silane on polyester basis |
|---|---|---|---|
|  | 4 days at 120° F. | 3 days at 100° F. and 90% relative humidity |  |
| Control B | 280 | 0 | 0 |
| Coating Adhesive 9B | 700 | 900 | 0.6 |
| Coating Adhesive 9C | 900 | 1100 | 1.2 |
| Coating Adhesive 9D | 1100 | 1200 | 1.8 |
| Coating Adhesive 9E | 1060 | 1260 | 2.3 |
| Coating Adhesive 9F | 1140 | 1200 | 2.7 |

EXAMPLE 10

Polyester Solution 10 was prepared as follows:

| POLYESTER SOLUTION 10 |  |
|---|---|
|  | % By Weight |
| Vitel 307 | 20 |
| Methyl ethyl ketone | 80 |

About 5% by weight of a molecular sieve with an affinity for water, commercially available under the trade designation "Linde 4A", was added to Polyester Solution 10. After 4 days, the water content of Polyester Solution 10 was reduced to about 0.04% by weight.

Adhesive Compositions 10C, 10D, 10F, 10H and 10K were prepared by admixing Polyester Solution 10 with Silane and dibutyl tin diacetate in the following proportions and incubating the mixture at 150° F. until infra-red analysis indicated that no free NCO was present. The control (Control 10B) consisted of only Polyester Solution 10 and dibutyl tin diacetate and was incubated for the same length of time as the foregoing Adhesive Compositions.

|  | ADHESIVE COMPOSITIONS | | | | | CONTROL 10B |
|---|---|---|---|---|---|---|
|  | 10C | 10D | 10F | 10H | 10K |  |
| Polyester Solution 10 | 100 | 100 | 100 | 100 | 100 | 100 |
| Dibutyl tin diacetate (2% solution in toluene) | 0.06 | 0.06 | 0.06 | 0.08 | 0.08 | 0.06 |
| Silane | 0.1 | 0.2 | 0.4 | 1.0 | 2.0 |  |
| NCO:OH | 0.5 | 1.0 | 2.0 | 5.0 | 10.0 |  |

Adhesive Composition 10L was prepared as follows, but was not subjected to incubation as were Adhesive Compositions 10C, 10D, 10F, 10H and 10K:

| ADHESIVE COMPOSITION 10L |  |
|---|---|
|  | % By Weight |
| Polyester Solution 10 | 100 |
| Silane | 0.4 |
| Dibutyl tin diacetate | 0.06 |

-continued

| ADHESIVE COMPOSITION 10L | |
|---|---|
| | % By Weight |
| (2% in solution toluene) | |
| NCO:OH | 2.0 |

Tinuvin 328 (1.5% by weight on solids basis) was added to each Adhesive Composition and also to Control 10B. Each Adhesive Composition and Control 10B were coated onto reflective smoke polyester solar film according to the procedure of Example 1 and force dried.

The coated films were wound onto a 1" core with a polypropylene slip sheet and incubated at 95° F. for one day. The coated films were then adhered to glass panels which were then attached to interior window glass facing Southeast. Bond strength values were recorded for each of the following sets of storage conditions:

| | BOND STRENGTHS | | | | | | |
|---|---|---|---|---|---|---|---|
| | ADHESIVE COMPOSITIONS | | | | | | Control |
| | 10C | 10D | 10F | 10H | 10K | 10L | 10B |
| 2 weeks SE exposure | 560 | 420 | 650 | 300 | 1190 | 500 | 525 |
| +3 days at 90% relative humidity, 100° F. | 750 | 720 | 1020 | 1400 | 1380 | 620 | 0 |
| +5 days at room temperature | 780 | 850 | 1120 | 1650 | 1580 | 680 | 450 |
| +1 day at 100° F., 100 relative humidity | 640 | 660 | 870 | 1800 | 1700 | 510 | 0 |
| % Silane (Polyester basis) | 0.5 | 1.0 | 2.0 | 5.0 | 10 | 2.0 | 0 |
| Reacted Silane | yes | yes | yes | yes | yes | no | — |

EXAMPLE 11

Polyester Solution 11A was prepared as follows:

| POLYESTER SOLUTION 11A | |
|---|---|
| | % By Weight |
| Vitel 307 | 20 |
| Methyl ethyl ketone | 80 |

Polyester Solution 11B and Adhesive Composition 11A were prepared as follows:

| | % By Weight |
|---|---|
| POLYESTER SOLUTION 11B | |
| Vitel 5833 | 30 |
| Methyl ethyl ketone (dried with Linde 4A for 4 days) | 70 |
| ADHESIVE COMPOSITION 11A | |
| Polyester Solution 11B | 100 |
| Silane | 5.9 |
| Dibutyl tin diacetate (2% solution in toluene) | 0.06 |

Polyester Solution 11B and Adhesive Composition 11A were incubated at a temperature of 140°-150° F. for 4 days, after which time no free NCO was detected by infra-red analysis.

The following Coating Compositions were prepared:

| | Coating Composition 11A | Coating Composition 11B | Coating Composition 11C |
|---|---|---|---|
| Polyester Solution 11A | 100 | 100 | 100 |
| Polyester Solution 11B | 10 | | 8.3 |
| Adhesive Composition 11A | | 9 | |
| Tinuvin 328 (10% solution in toluene) | 3.5 | 3.5 | 3.5 |
| Toluene | 5 | 6 | 6.2 |
| Silane | | | 0.5 |

The Coating Compositions were coated onto the dyed polyester surface of reflective smoke polyester film according to the procedure of Example 1 and force dried. Reflective smoke polyester film is a laminate comprising a base sheet of clear polyester film, a vapor deposited coating of aluminum on one side of said base sheet with a light smoke polyester film adhered to the aluminum coating.

The dried, coated films were rolled up with a polypropylene slip sheet and stored for 3 days at a temperature of 95° F., after which time the coated films were adhered to glass panels and exposed to south-east exposure sunlight by attaching the glass panels to the interior surface of window glass.

The following bond strengths were obtained after the indicated exposure conditions:

| | BOND STRENGTHS | | |
|---|---|---|---|
| | Coating Composition 11A | Coating Composition 11B | Coating Composition 11C |
| 3 days | 330 | 490 | 310 |
| 3 days at 90% relative humidity and 100° F. | 0 | 1150 | 500 |
| 1 month at room temperature | 490 | 1800 | 700 |
| 1 day at 100% relative humidity and 100° F. | 0 | 700 | 250 |
| % Silane (Polyester Basis) | 0 | 2.1 | 2.1 |
| Reacted Silane | None present | Yes | No |

EXAMPLE 12

A 2 mil. polyester film, metallized to a high opacity (optical density of 3.7) so as to reflect a maximum of incident light and thereby function as a mirror, was coated on the metal surface thereof with an acrylic resin protective coating containing the ultraviolet absorber Tinuvin 328.

This protectively coated, metallized polyester film is hereinafter referred to as "The Film".

The reverse side, i.e., the uncoated polyester surface, of one sheet of The Film was coated with Control 10B, as described in Example 10. The reverse side of a second sheet of The Film was coated with Adhesive Composition 10F, as described in Example 10.

Duplicate specimens of The Film coated respectively with Control 10B and Adhesive Composition 10F were adhered to glass panels to form film-glass panel laminates, using water and a squeegee, after which time the glass panel laminates were incubated at 95° F. for 3 days. The following bond strength values of said film-glass panel laminates were obtained:

|  | BOND STRENGTHS - 95° F., 3 DAYS | |
|---|---|---|
|  | Control 10B | Adhesive Composition 10F |
|  | 370 | 1020 |
| % Silane (Polyester Basis) | 0 | 2.0 |

In another experiment, one pair of said film-glass panel laminates was exposed to a temperature of 100° F. and 100% Relative Humidity for one hour. A second pair of said film-glass panel laminates was exposed outdoors at an inclination of 30° from the vertical for 4 days, during which time 3 heavy rainfall downpours occurred. The resultant bond strengths were as follows:

| BOND STRENGTHS | |
|---|---|
| Control 10B | Adhesive Composition 10F |
| 100° F., 100% RELATIVE HUMIDITY | |
| 0 | 800 |
| 4 DAYS OUTDOORS | |
| 0 | 900 |

In the outdoor exposure, a heavy orange skin-like peel developed on The Film adhered to the glass by Control 10B, whereas The Film adhered to the glass by Adhesive Composition 10F remained smooth.

Thus, The Film adhered to glass with an adhesive containing the reacted Silane lends itself to being useful in the design of solar concentrators and heliostats whose reflective surfaces can be installed in the field and replaced when solar exposure diminishes the reflectivity of the top coated metallized surface.

EXAMPLE 13

A 2 mil. polyester film having a coating thereon of vapor-deposited aluminum was coated on the aluminum side with the Control 10B composition of Example 10, according to the coating procedure described in Example 1. Another specimen of the same film was coated in the same manner on the aluminum side with Adhesive Composition 10F of Example 10. Each metallized and coated film was adhered to a glass panel in the usual manner, i.e., by wetting both the adhesive coating and the glass panel and using a squeegee. The following bond values were determined after storage under the indicated exposure conditions:

| Exposure | BOND STRENGTHS | |
|---|---|---|
|  | Control | Adhesive Composition 10F |
| 4 days - 95° F. | 500 | 550 |
| 1 day - 90% relative humidity, 100° F. | 50 | 660 |
| 4 days - 90% relative humidity, 100° F. | 0 | 1400 |
| 1 day - 100% relative humidity, 100° F. | 0 | 1100 |

Optical density measurements were made (by means of a Densicron Photometer) on the glass panels coated with the film adhered by Control 10B and that adhered by Adhesive Composition 10F respectively, both before and after the above described exposures to determine the extent of loss, if any, of the aluminum deposit. There was considerable loss of aluminum on the Control 10B-coated film adhered to glass, whereas the Adhesive Composition 10F-coated film adhered to glass showed no aluminum loss, as evidenced by the following optical density readings:

|  | OPTICAL DENSITY | |
|---|---|---|
|  | Control 10B-Coated Film | Adhesive Composition 10F-Coated Film |
| Before weathering* | 2.7 | 2.8 |
| After weathering* | 2.1 | 2.8 |

*Exposure to high humidity and 100° F. temperature.

In view of the fact that the optical density scale is a logarithmic one, a decrease of 0.6 optical density units for the Control 10B-coated film represents a considerable loss of the aluminum deposit. The retention of the aluminum coating in the instance of the Adhesive Composition 10F indicates the protective nature of the adhesives of the present invention.

What is claimed is:

1. A solar film for adherence to glass for solar control, said solar film having a coating on one side thereof of a water-activatable adhesive comprising the reacted product of (A) gamma-isocyanatopropyltriethoxy silane and (B) a thermoplastic polyester formed by reacting (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, in which substantially no free isocyanate (NCO) remains in the adhesive.

2. An opaquely metallized solar film for adherence to a metal substrate to function as a reflective surface for focusing incident sunlight to provide heat, said solar film having a coating on one side thereof of a water-activatable adhesive comprising the reacted product of (A) gamma-isocyanatopropyltriethoxy silane and (B) a thermoplastic polyester formed by reacting (i) a dibasic acid selected from the group consisting of terephthalic acid, isophthalic acid, and hexahydrophthalic acid and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids, in which substantially no free isocyanate (NCO) remains in the adhesive.

* * * * *